United States Patent
Galejs (10) Patent No.: US 10,211,531 B2
(45) Date of Patent: Feb. 19, 2019

(54) COMPACT STEERABLE TRANSMIT ANTENNA SYSTEM

(71) Applicant: Massachusetts Institute of Technology, Cambridge, MA (US)

(72) Inventor: Robert Galejs, Carlisle, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/520,098

(22) PCT Filed: Nov. 5, 2015

(86) PCT No.: PCT/US2015/059168
§ 371 (c)(1),
(2) Date: Apr. 19, 2017

(87) PCT Pub. No.: WO2016/073677
PCT Pub. Date: May 12, 2016

(65) Prior Publication Data
US 2017/0317415 A1     Nov. 2, 2017

Related U.S. Application Data

(60) Provisional application No. 62/075,480, filed on Nov. 5, 2014.

(51) Int. Cl.
*H01Q 5/10* (2015.01)
*H01Q 3/28* (2006.01)
(Continued)

(52) U.S. Cl.
CPC .............. *H01Q 3/28* (2013.01); *G01S 3/143* (2013.01); *H01Q 1/28* (2013.01); *H01Q 7/06* (2013.01);
(Continued)

(58) Field of Classification Search
CPC .. H01Q 3/28; H01Q 1/28; H01Q 7/06; H01Q 21/22; H01Q 21/26; H01Q 21/298
(Continued)

(56) References Cited

U.S. PATENT DOCUMENTS

| 5,066,917 A | 11/1991 | Stolarczyk |
| 5,185,678 A | 2/1993 | Stolarczyk |

(Continued)

FOREIGN PATENT DOCUMENTS

| GB | 2267603 A | 12/1993 |
| WO | 2009151699 A1 | 12/2009 |

OTHER PUBLICATIONS

Gupta, Shulabh, et al; "Magnetoelectric Dipole Antenna Arrays"; IEEE Transactions on Antennas and Propagation 62.7 (Jul. 2014): 3613-22.
(Continued)

*Primary Examiner* — Lam T Mai
(74) *Attorney, Agent, or Firm* — Peter A. Nieves; Sheehan Phinney Bass & Green PA (57) ABSTRACT

A transmit antenna system configured to steer an electromagnetic beam includes an antenna and an electronic steering module. The antenna includes a first electric antenna element oriented parallel to a first plane, a second electric antenna element oriented orthogonally to the first electric antenna element and parallel to the first plane, and a first magnetic antenna element oriented orthogonally to the first electric antenna element and the second electric antenna element. The electronic steering module is in electrical communication with each of the first electric antenna element, the second electric antenna element, and the first magnetic antenna element. The electronic steering module includes at least one amplifier configured to control the amplitude of a current to each of the first electric antenna (Continued)

element, the second electric antenna element, and the first magnetic antenna element.

10 Claims, 8 Drawing Sheets

(51) Int. Cl.
| | |
|---|---|
| *G01S 3/14* | (2006.01) |
| *H01Q 21/24* | (2006.01) |
| *H01Q 25/00* | (2006.01) |
| *H01Q 21/29* | (2006.01) |
| *H01Q 1/28* | (2006.01) |
| *H01Q 7/06* | (2006.01) |
| *H01Q 21/22* | (2006.01) |
| *H01Q 21/26* | (2006.01) |

(52) U.S. Cl.
CPC .............. *H01Q 21/22* (2013.01); *H01Q 21/24* (2013.01); *H01Q 21/26* (2013.01); *H01Q 21/29* (2013.01); *H01Q 21/293* (2013.01); *H01Q 25/001* (2013.01)

(58) Field of Classification Search
USPC ......................................................... 343/726
See application file for complete search history.

(56) References Cited

U.S. PATENT DOCUMENTS

| | | | | |
|---|---|---|---|---|
| 5,260,660 | A | 11/1993 | Stolarczyk | |
| 6,091,374 | A * | 7/2000 | Barnes | H01Q 9/005 |
| | | | | 343/767 |
| 6,822,574 | B2 | 11/2004 | Nakamura | |
| 8,081,699 | B2 * | 12/2011 | Siwiak | H01Q 21/24 |
| | | | | 375/267 |
| 2003/0078731 | A1 | 4/2003 | Nakamura | |
| 2008/0013445 | A1 * | 1/2008 | Siwiak | H01Q 21/24 |
| | | | | 370/206 |
| 2012/0007787 | A1 * | 1/2012 | Schantz | G01S 5/14 |
| | | | | 343/788 |
| 2012/0025977 | A1 * | 2/2012 | Schantz | G08B 21/0272 |
| | | | | 340/539.13 |
| 2013/0321239 | A1 * | 12/2013 | Bingham | H01Q 1/24 |
| | | | | 343/879 |

OTHER PUBLICATIONS

Aussenhofer, S. et al; "An eight-channel transmit/receive array of TE01 mode high permittivity ceramic resonators for human imaging at 7 T"; Journal of Magnetic Resonance 243 (Jun. 2014): 122-9.
Chien-Ching Chiu, et al; "MIMO-UWB smart antenna communication characteristics for different antenna arrays of transmitters"; International Journal of RF and Microwave Computer-Aided Engineering 23.3 (May 2013): 378-92.
Singh, Hema, et al; "Mutual coupling in phased arrays; a review"; International Journal of Antennas and Propagation (2013): 348123 (23).
Chahine, M. Abou, et al; "A calibrated near field scanning system applied to the characterization of IC electromagnetic radiation"; In 2012 2nd International Conference on Advances in Computational Tools for Engineering Applications, ACTEA 2012 , by Chahine, M. Abou, Perdriau, R., Ramdani, M., Saleh, A., 124-127. United States:IEEE Computer Society, Dec. 1, 2012.
Zakharova, Nadezhda T. et al; "Comprehensive T-matrix reference database: a 2009-2011 update"; Journal of Quantitative Spectroscopy and Radiative Transfer 113.14 (Sep. 2012): 1844-52.
Ibrahim, Amr, et al; "Passive single chip wireless microwave pressure sensor"; Sensors and Actuators: A Physical 165.2 (Feb. 2011): 200-6.
Hall, P. S., et al; "Dipoles and loop antennas with left handed loading"; In 2008 Loughborough Antennas & Propagation Conference , by Hall, P. S., Liu, Q., 193-6. Piscataway, NJ, USA:IEEE, 2008.
Andreev, Yu.A., et al; "A combined antenna with extended bandwidth"; Journal of Communications Technology and Electronics 50.5 (Aug. 9, 2005): 535-543.
Andreev, Yu. A, et al; "An element of the scanning antenna array for radiation of high-power ultrabroadband electromagnetic pulses"; Journal of Communications Technology and Electronics 44.5 (May 1999): 492-8.
Andreev, Yu A, et al; "An element of scanning antenna array for the radiation of high-power ultrabroadband electromagnetic pulses"; Radiotekhnika I Ehlektronika 44.5 (May 1999): 531-537.
Kondratjev, Michael S., et al; "Reflection and transmission of plane waves in bianisotropic planar grids"; In Proceedings of SPIE—The International Society for Optical Engineering by Kondratjev, Michael S., Simovski, Constantine R., Belov, Pavel A., 669-678. SPIE, Dec. 1, 1998.
Kondratjev, Michael S, et al; "Reflection and transmission of plane waves in bianisotropic planar grids"; In Smart structures and materials 1998: Mathematics and control in smart structures; Proceedings of the Meeting, San Diego, CA; United States: Mar. 2-5, 1998 , by Kondratjev, Michael S, Simovski, Constantine R, Belov, Pavel A, 669-678. Bellingham, WA: Society of Photo-Optical Instrumentation Engineers (SPIE Proceedings. vol. 3323), Mar. 1998.
Hill, D.A; "Gradiometer antennas for detection of long subsurface conductors"; Journal of Electromagnetic Waves and Applications 8.2 (Dec. 1, 1994): 237-248.
Aydin, Ozlem, et al; "Electronic beam scanning in millimeter-wave band with dielectric-ferrite loaded antennas"; In Mediterranean Electrotechnical Conference—MELECON , by Aydin, Ozlem, Hizal, Altunkan, of 3/–. IEEE, Dec. 1, 1994.
Aydin, O., et al; "Electronic beam scanning in millimeter-wave band with dielectric-ferrite loaded antennas"; In 7th Mediterranean Electrotechnical Conference. Proceedings (Cat. No. 94CH3388-6) , by Aydin, O., Hizal, A., 410-13 vol. 2;3 vol. xvi+1348. New York, NY, USA:IEEE, 1994.
Hill, David A.; "Gradiometer antennas for tunnel detection"; Gradiometer antennas for tunnel detection . (Nov. 1992).
Hill, David A.; "Gradiometer antennas for tunnel detection"; National Technical Information Service . (Jun. 1992).
Robert J. Galejs and Alan J. Fenn; "Novel Compact Steerable Antenna with Radar Applications"; 2015 IEEE Radar Conference (RadarCon).
Galais, et al Novel Radar for UAS SAA; Lincoln Laboratory; MIT; Oct. 29, 2014.
Robert Galejs and Alan Fenn; "Novel Compact Steerable Antenna with Radar Applications"; 2015 IEEE International Radar Conference; Lincoln Laboratory; MIT; MIT May 14, 2015.

* cited by examiner

COMPACT STEERABLE TRANSMIT ANTENNA SYSTEM

CROSS-REFERENCE TO RELATED APPLICATIONS

This application claims the benefit of U.S. Provisional Patent Application Ser. No. 62/075,480, filed Nov. 5, 2014, entitled "Novel Compact Steerable Antenna," which is incorporated by reference herein in its entirety.

STATEMENT REGARDING FEDERALLY SPONSORED RESEARCH OR DEVELOPMENT

This invention was made with Government support under Contract No. FA8721-05-C-0002 awarded by the U.S. Air Force. The Government has certain rights in the invention.

FIELD OF THE INVENTION

The present invention relates to antennas, and more particularly, is related to a compact steerable antenna.

BACKGROUND OF THE INVENTION

Vector-sensor receive antennas facilitate direction finding at low frequencies, for example a frequency range according a half wavelength of the antenna size, by measuring the three components of the incident electric and magnetic fields. An example for use of a vector-sensor receive antenna is receiving radar signals reflected off of a remote object.

Traditional phased array antennas typically have a field of view (FoV) of approximately 120° per face, and may exhibit scan loss and modest to high peak gain. Further, such antennas have been too large and/or heavy to be practical in small unmanned air systems (UAS) or unmanned aerial vehicles (UAV) for sense and avoid (SAA) functionality. Therefore, there is a need to address one or more of the abovementioned problems.

SUMMARY OF THE INVENTION

Embodiments of the present invention provide a compact steerable antenna. Briefly described, the present invention is directed to a transmit antenna system having an antenna and an electronic steering module configured to steer an electromagnetic beam. The antenna includes a first electric antenna element oriented parallel to a first plane, a second electric antenna element oriented orthogonally to the first electric antenna element and parallel to the first plane, and a first magnetic antenna element oriented orthogonally to the first electric antenna element and the second electric antenna element. The electronic steering module is in electrical communication with each of the first electric antenna element, the second electric antenna element, and the first magnetic antenna element. The electronic steering module includes at least one amplifier configured to control the amplitude of a current to each of the first electric antenna element, the second electric antenna element, and the first magnetic antenna element.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Reference will now be made in detail to embodiments of the present invention, examples of which are illustrated in the accompanying drawings. Wherever possible, the same reference numbers are used in the drawings and the description to refer to the same or like parts.

This application describes exemplary embodiments of vector-sensor receive antennas which facilitate direction finding at low frequencies with a compact single phase center antenna by measuring the three components each of the incident electric and magnetic fields of an electromagnetic wave. This antenna geometry can also be used to form directional beams with modest gain on transmit by exciting the electric and magnetic fields appropriately. Such a transmit antenna has not previously been built. This antenna has several interesting properties: transmission in any direction (over $4\pi$ steradians) with a fixed beam pattern and very low scan loss, scanning achieved through amplitude weighting only, and a directivity independent of frequency. The beam pattern may be a fixed cardioid shape with a single peak transitioning smoothly to a single null opposite the peak. These antennas can be configured in both 2-D scan (azimuth only scanning) and 3-D scan (arbitrary scanning) geometries.

Vector sensors utilize polarization sensitive antenna elements. Three dimensional angle of arrival (AoA) is recovered by measuring electric and magnetic fields in different planes. Since electric and magnetic fields are orthogonal to the direction of propagation of a signal, coverage for all possible AoA requires six channels: 3 electric channels and, three magnetic channels. Examples of antennas include a magnetic loop antenna and an electric dipole antenna.

When compared with a traditional phased array antenna, a compact steerable antenna has a field of view (FoV) of 360°, compared with approximately 120° per face for a phased array antenna. A compact steerable antenna has no scan loss, and modest peak gain, in contrast with modest to high peak gain for a traditional phased array.

Figure 1:
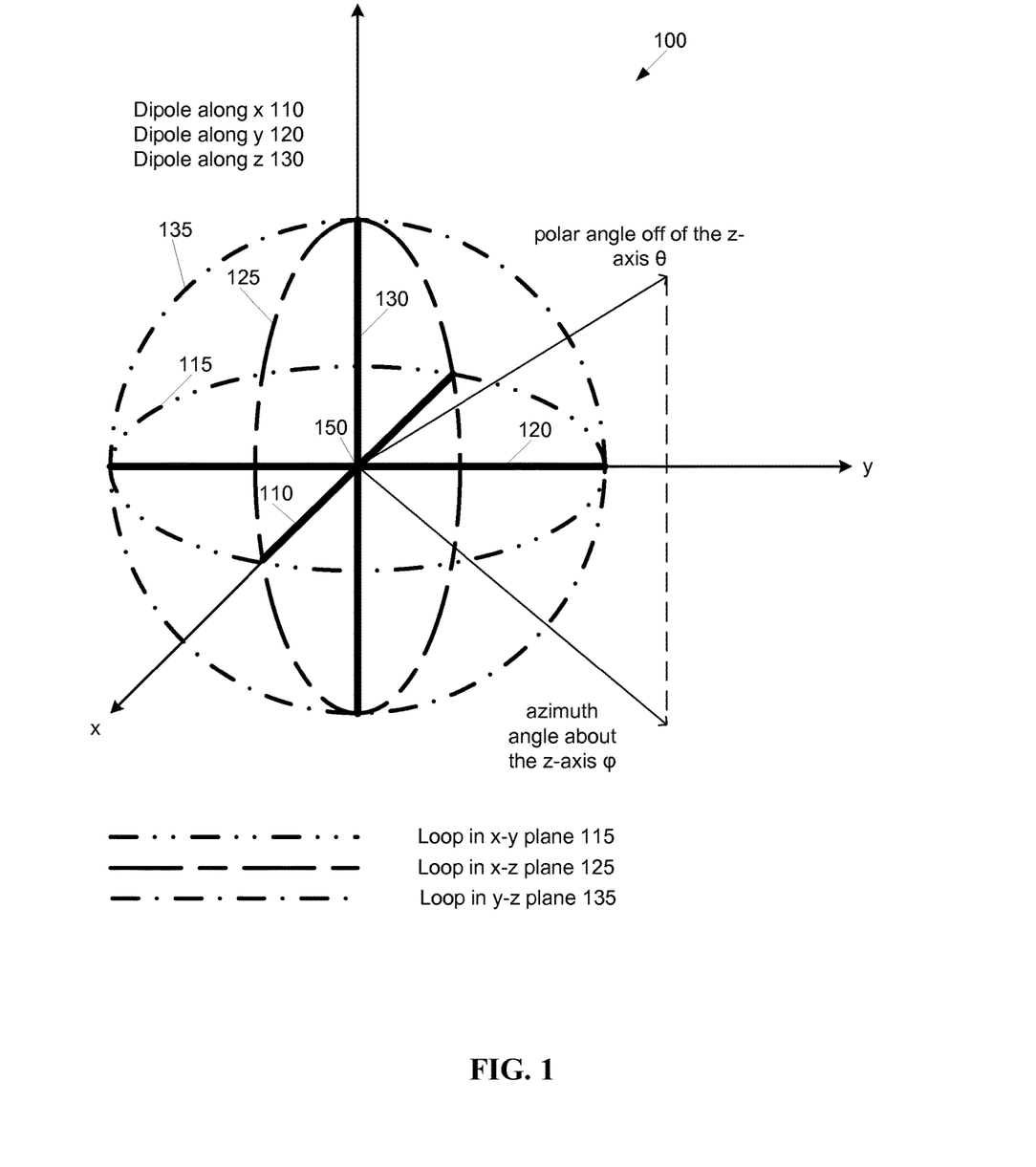
FIG. 1 is a schematic diagram showing an exemplary embodiment of a compact steerable antenna configuration in three dimensions.

FIG. 1 shows an exemplary embodiment of a compact steerable antenna (CSA) 100 composed of electric dipoles 110, 120, 130 and magnetic loops 115, 125, 135 arranged in a mutually orthogonal configuration about a rectangular coordinate system with an x-axis, a y-axis, and a z-axis centered at an origin 150. Magneto-electric antenna elements have previously been described but none have been leveraged for arbitrary angle steering. Under the first embodiment, the dipoles 110, 120, 130 and magnetic loops 115, 125, 135 are generally centered on the origin 150. A first dipole 110 is arranged along the x-axis, a second dipole 120 is arranged along the y-axis, and a third dipole 130 is arranged along the z-axis. A first magnetic loop 115 is oriented in the x-y plane, a second magnetic loop 125 is oriented in the x-z plane, and a third magnetic loop 135 is oriented in the y-z plane.

The polar angle off of the z-axis is $\theta$ and the azimuth angle about the z-axis is $\varphi$. Unit vectors in the increasing $\theta$ and $\varphi$ directions are $\hat{\theta}$ and $\hat{\varphi}$ respectively. The desired beam direction is described by $\theta_0$ and $\varphi_0$, with unit vector $\hat{u}_0$ (see Eq. 1). A unit vector in an arbitrary direction is $\hat{u}$ (see Eq. 2). A linear polarization direction $\psi$ is measured with respect to $\hat{\varphi}$. $E_\theta$ polarization corresponds to $\psi=\pi/2$ and $E_\varphi$ polarization corresponds to $\psi=0$.

$$\hat{u}_0 = [\sin\theta_0 \cos\varphi_0, \sin\theta_0 \sin\varphi_0, \cos\theta_0] \quad (1)$$

$$\hat{u} = [\sin\theta \cos\varphi, \sin\theta \sin\varphi, \cos\theta] \quad (2)$$

The angular dependence of the electric far-fields from electrically small dipoles and loops are shown in Eqs. 3-8 for the full 3-D scanning case. Constants $a_1$-$a_6$ in Eqs. 3-16 are the relative amplitudes that are dependent on the excitation currents and subsume all other parameters that are not angle dependent. Determining the current necessary to achieve these relative amplitudes requires accounting for these other parameters. If the antenna elements are excited with the values indicated in Eqs. 9-14, a beam in the $\hat{u}_0$ direction with polarization $\psi$ is formed.

$$\vec{E}_{xzLoop}^{FF} = a_1[\hat{\varphi} \cos\theta \sin\varphi - \hat{\theta} \cos\varphi] \quad (3)$$

$$\vec{E}_{yzLoop}^{FF} = a_2[\hat{\varphi} \cos\theta \sin\varphi + \hat{\theta} \cos\varphi] \quad (4)$$

$$\vec{E}_{xyLoop}^{FF} = a_2[-\hat{\varphi} \sin\theta] \quad (5)$$

$$\vec{E}_{xDipole}^{FF} = a_4[-\hat{\varphi} \sin\varphi + \hat{\theta} \cos\theta \cos\varphi] \quad (6)$$

$$\vec{E}_{yDipole}^{FF} = a_5[\hat{\varphi} \cos\varphi + \hat{\theta} \cos\theta \sin\varphi] \quad (7)$$

$$\vec{E}_{xDipole}^{FF} = a_6[-\hat{\theta} \sin\theta] \quad (8)$$

$$a_1 = -\sin\psi \cos\varphi_0 + \cos\psi \cos\theta_0 \sin\varphi_0 \quad (9)$$

$$a_2 = -\sin\psi \sin\varphi_0 + \cos\psi \cos\theta_0 \cos\varphi_0 \quad (10)$$

$$a_3 = -\cos\psi \sin\theta_0 \quad (11)$$

$$a_4 = -\cos\psi \sin\varphi_0 + \sin\psi \cos\theta_0 \cos\varphi_0 \quad (12)$$

$$a_5 = \cos\psi \cos\varphi_0 + \sin\psi \cos\theta_0 \sin\varphi_0 \quad (13)$$

$$a_6 = -\sin\psi \sin\theta_0 \quad (14)$$

Gathering the $\hat{\theta}$ and $\hat{\varphi}$ components of the electric fields results in:

$$E_{\hat{\varphi}} = a_1\cos\theta \sin\varphi + a_2\cos\theta \cos\varphi - a_3\sin\theta - a_4\sin\varphi + a_5\cos\varphi \quad (15)$$

$$E_{\hat{\theta}} = -a_1\cos\varphi + a_2\sin\varphi + a_4\cos\theta \cos\varphi + a_5\cos\theta \sin\varphi - a_6\sin\theta \quad (16)$$

After trigonometric manipulations (omitted for brevity), it can be shown that the un-normalized full field gain is:

$$E_{\hat{\varphi}}^2 + E_{\hat{\theta}}^2 = \quad (17)$$
$$[1 + \sin\theta \cos\varphi \sin\theta_0 \cos\varphi_0 + \sin\theta \sin\varphi \sin\theta_0 \sin\varphi_0 + \cos\theta\cos\theta_0]^2$$

$$= [1 + \hat{u}_0 \cdot \hat{u}]^2 = [1 + \cos\theta_{off}]^2 \quad (18)$$

Where $\theta_{off}$ is the angle between the unit vectors $\hat{u}_0$ and $\hat{u}$. The integral of the full field gain over all angles must be $4\pi$ yielding a normalization factor of $3/4$. Thus, the full-field antenna directivity is 0.75 $(1+\cos(\theta_{off}))^2$, independent of look direction and polarization. The antenna scans by adjusting the current amplitudes in the loops rather than any phase shifts.

This analysis demonstrates that, ideally, a beam can be pointed in an arbitrary direction over $4\pi$ steradians with absolutely no scan loss. Scanning may be accomplished through varying the amplitude of each excitation with no phase variation at all. Setting $a_3=a_4=a_5=0$ and $\psi=\pi/2$ and $\theta_0=\pi/2$ results in the simplified 2-D scanning case (z-dipole 130, xz loop 125, and yz loop 135 only) with the beam steering in the x-y plane through $\sin(\varphi_0)$ and $\cos(\varphi_0)$ weightings of the two loops.

Under the first embodiment, the antenna 100 provides modest gain and directivity with a single phase center 5 dBi with an approximately 130° azimuth beam, where the beam is a single beam with a single null 180° opposite the beam peak. Azimuth scanning is provided by amplitude weighting loop currents in two a dimensional scan to polarization $\psi°$ with $\cos(\psi)$ current in a first loop antenna and $\sin(\psi)$ current in a second loop antenna.

Although the first embodiment antenna 100 describes and depicts the electric dipoles 110, 120, 130 and magnetic loops 115, 125, 135 as being co-located, in alternative embodiments the loops and/or dipoles may be spatially distributed. In such a spatially distributed embodiment, it is desirable for the individual loops and/or dipoles to be located a small fraction of a wavelength apart.

The magnetic loops 115, 125, and 135 are depicted in FIG. 1 as circular loops. However, persons having ordinary skill in the art will recognize that the loops need not be circular. For example, the magnetic loops 115, 125, and 135 loops may be substantially rectangular in shape.

Figure 2A:
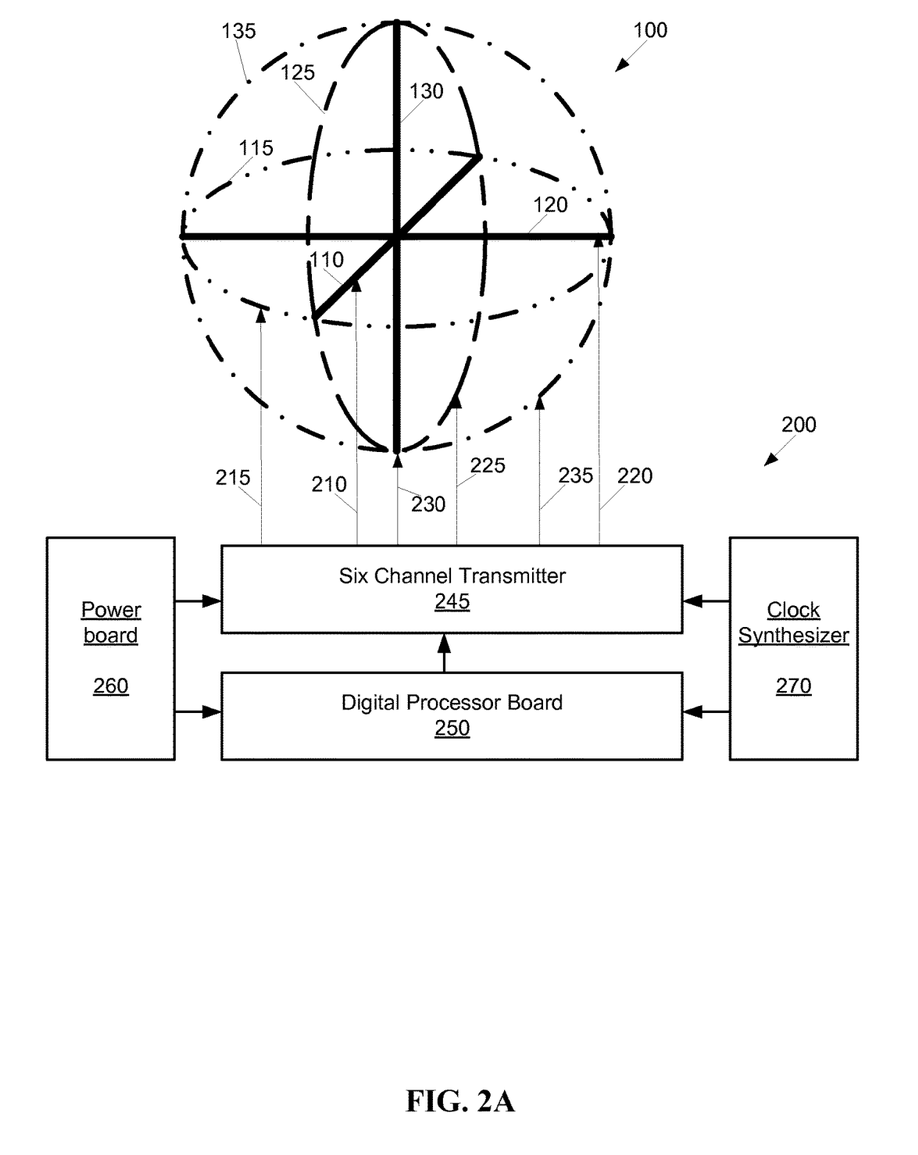
FIG. 2A is a schematic diagram of an exemplary embodiment of a system for transmitting signals via from the antenna of FIG. 1.

FIG. 2A is a schematic diagram of an embodiment of an electronic steering system 200 for transmitting a steerable beam from the antenna 100. Each of the electric dipoles 110, 120, 130 and magnetic loops 115, 125, 135 transmits an independent electrical signal, or channel, 210, 215, 220, 225, 230, 235 which may be produced by the electronic steering system 200 including a six channel transmitter 245, a digital processing board 250, a power board 260, and a clock synthesizer 270. Specifically, the first electric dipole 110 transmits a first channel 210, the second electric dipole 120 transmits a second channel 220, the third electric dipole 130 transmits a third channel 230, the first magnetic loop 115 transmits a fourth channel 215, the second magnetic loop 125 transmits a fifth channel 225, and the third magnetic loop 135 transmits a sixth channel 235. The six channel transmitter 245 generates and conveys the six channels 210, 215, 220, 225, 230, 235, for example, via electrical leads, where the transmitter 245 produces the channels 210, 215, 220, 225, 230, 235, for example, by tuning, filtering, amplifying, and/or converting the channels from digital to analog.

The digital board 250 generates the channels for the transmitter 245, for example converting input digital signal data to an analog output data format for transmission. The electronic steering system 200 may also include other components, for example, a clock synthesizer 270 configured to ensure accurate timing/synchronization within system components, and a power board 260 to provide power to system components.

Figure 2B:
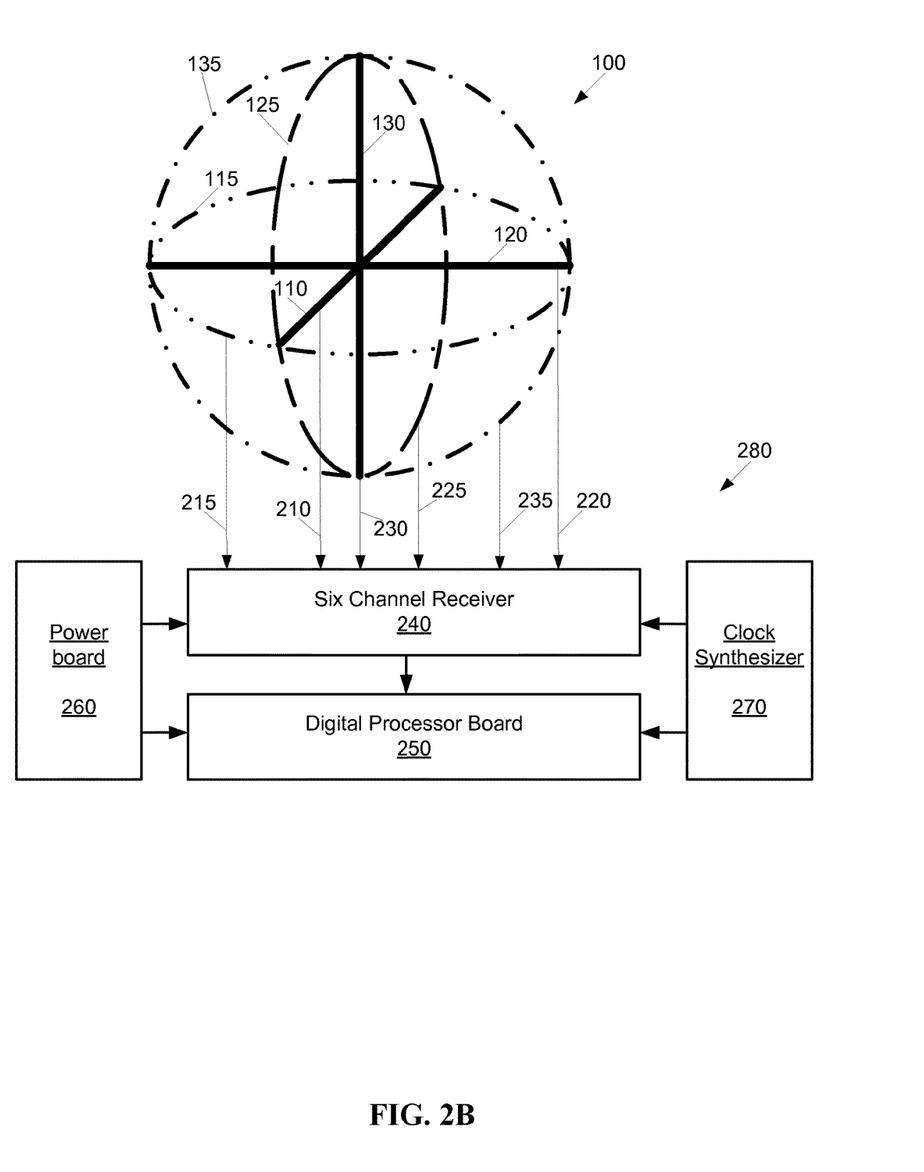
FIG. 2B is a schematic diagram of an exemplary embodiment of a system for processing signals received from the antenna of FIG. 1.

FIG. 2B is a schematic diagram of an embodiment of a receiver system 280 for processing signals output from the antenna 100. Each of the electric dipoles 110, 120, 130 and magnetic loops 115, 125, 135 produces an independent electrical signal, or channel, 210, 215, 220, 225, 230, 235 which may be processed by the system 280 including a six channel receiver 240, a digital processing board 250, a power board 260, and a clock synthesizer 270. Specifically, the first electric dipole 110 produces a first channel 210, the second electric dipole 120 produces a second channel 220, the third electric dipole 130 produces a third channel 230, the first magnetic loop 115 produces a fourth channel 215, the second magnetic loop 125 produces a fifth channel 225, and the third magnetic loop 135 produces a sixth channel 235. The six channel receiver 240 receives the six channels 210, 215, 220, 225, 230, 235, for example, via electrical leads, where the receiver 240 processes the channels 210, 215, 220, 225, 230, 235, for example, by tuning, filtering, amplifying, and/or converting the channels from analog to digital.

The digital board 250 receives the processed channels from the receiver 240 and operates on the received signal data to convert the received signal data to an output data format, for example, detection information determined by the received channels. The system 200 may also include other components, for example, a clock synthesizer 270 configured to ensure accurate timing/synchronization within system components, and a power board 260 to provide power to system components.

The systems 200, 280 may include additional components not shown in FIGS. 2A, 2B, for example, a communications device to convey detection information processed by the digital board 250. Similarly, the transmitter system 200 and the receiver system 280 may be combined to function as a transceiver (not shown), for example wherein the transmitter 240 and receiver 245 may optionally be implemented as a transceiver. The components of the systems 200, 280 may be housed together, for example, in a housing or chassis, or may be distributed. For example, the components of the systems 200, 280 may be distributed throughout the structure of an aircraft, such as a UAV, to evenly distribute weight.

CSA antennas 100 may be composed of both electric and magnetic dipole antenna elements of any material typically used in antenna design and construction. For example, such materials may include, but are not limited to metals such as copper steel or aluminum.

There is no restriction on the antenna element sizes, but the most efficient dimensions are preferably half-wavelength long electric dipoles 110, 120, 130 and/or half-wavelength diameter magnetic dipole loops. The magnetic loops 115, 125, 135 need not be circular and may be, for example, squares or any other polygonal shape as well as ellipses or any other curved shape.

Figure 7:
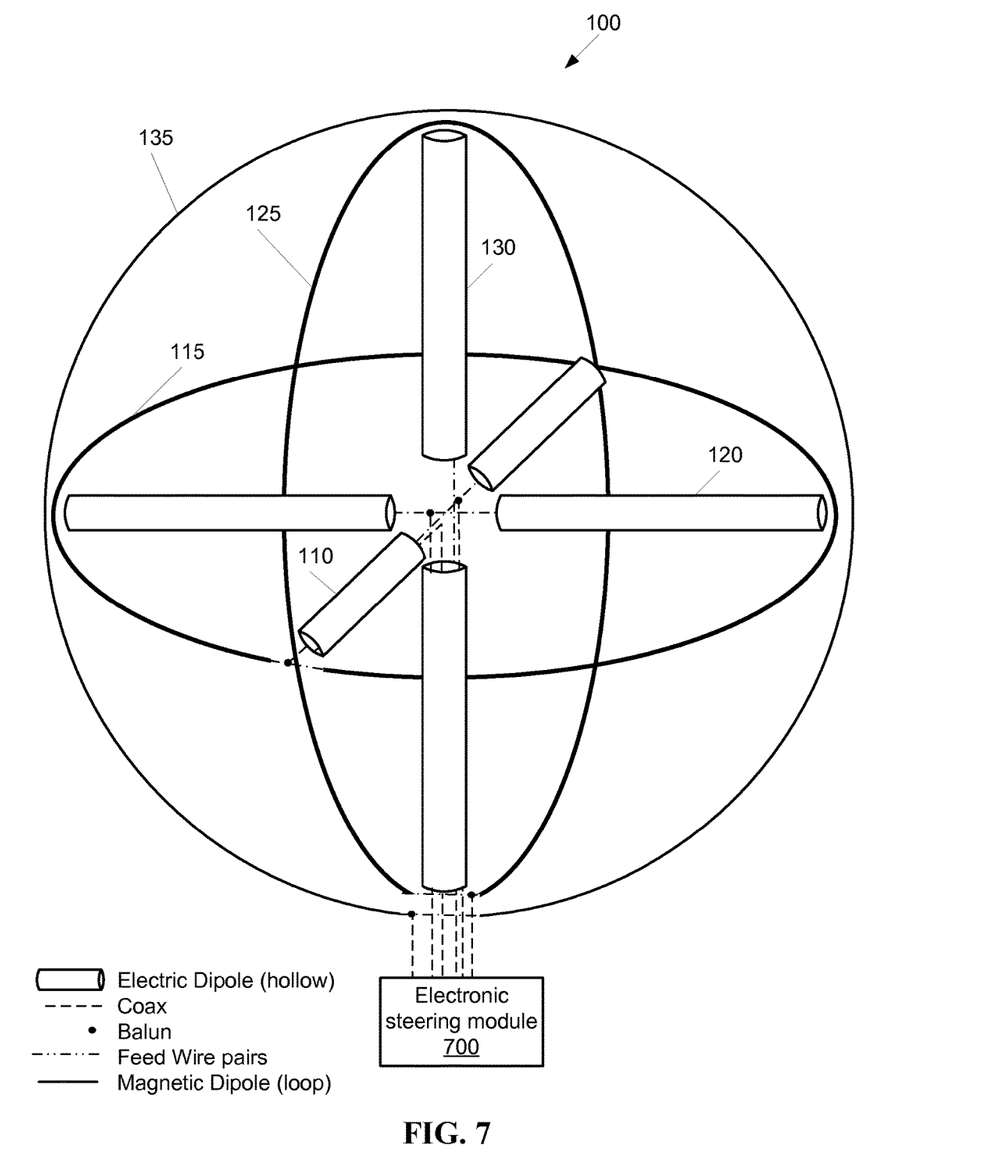
FIG. 7 is a schematic diagram detailing connections for the exemplary embodiment of the compact steerable antenna of FIG. 1.

Both the magnetic and electric antenna elements are shown as being composed of thin wire in FIG. 1, but a thicker and/or hollow tubular material such (with or without closed endcaps) may be used as well for the electric antenna elements 110, 120, 130, as shown in FIG. 7. The signals between the electronic steering system 700 and the antenna 100 may be conveyed to via coaxial cables, and connect to feed wire pairs at each of the electric dipoles 110, 120, 130 and magnetic loops 115, 125, 135, for example, joined using a balun.

The electric dipoles 110, 120, 130 may alternatively be in the form of butterfly antennas, for example, when a wider bandwidth than a thin wire antenna can provide is desired. These antenna elements may also be instantiated with an image in a ground plane. The electric dipole elements 110, 120, 130 may be composed of a monopole element above the ground plane and the magnetic loops 115, 125, 135 may be composed of a half-loop above the ground plane.

The loop diameter and dipole lengths are depicted in FIG. 1 as being equal, but alternative embodiments for the antenna may have differing lengths and diameters. Dipoles with longer length than the loop diameter may be desirable to reduce mutual coupling effects. The three loops 115, 125, 135 need not be the same size nor the dipoles 110, 120, 130 of equal length. However, if different sizes are used, the steering calculations needs to account for the differing gain of the mismatched elements. For example, an additional amplitude term may need to be added (see Eqs. 9-14 above).

The CSA functionality is most easily described using mutually orthogonal elements, but other arrangements may be used in alternative embodiments. Any arrangement of loops 115, 125, 135 or dipoles 110, 120, 130 that has some dipole moment along the x, y and z axes may be made to function in the same manner as described for the orthogonal case by adjusting the signal processing accordingly. However, the beam steering is then adjusted to account for this non-orthogonal geometry. The 3-loop 115, 125, 135 and 3-dipole 110, 120, 130 assemblies may be rotated with respect to one another if desired to accommodate mounting or other constraints.

Although FIGS. 1, 2A, 2B, 2C, 7 show a general case of a CSA having of three loops 115, 125, 135 and three dipoles 110, 120, 130, limited scanning/steering antennas can be composed of as few as three total elements. The general case allows general angle steering with arbitrary polarizations, while the three antenna cases only support single plane scanning with a fixed, linear polarization. Two alternative embodiments of this limited scanning/steering case include two electric dipoles (110 and 120) plus a loop (115) which provides a horizontally polarized beam which can scan in the xy plane, and two loops (125 and 135) plus a dipole (130) which provides a vertically polarized beam which can scan in the xy plane. Scanning/steering in other planes can be provided by orienting these three-element antennas appropriately. Other exemplary combinations for a CSA may include two loops and two dipoles, two loops and three dipoles, and one loop and three dipoles.

While the loop and dipole centers are shown as having a common location (the origin in FIG. 1), other configurations are possible. However, a non-common origin will complicate the steering commands by adding a phase shift component. As long as these element centers are located within approximately half a wavelength of one another, then the CSA will operate without the above mentioned phase shift component.

Figure 3:
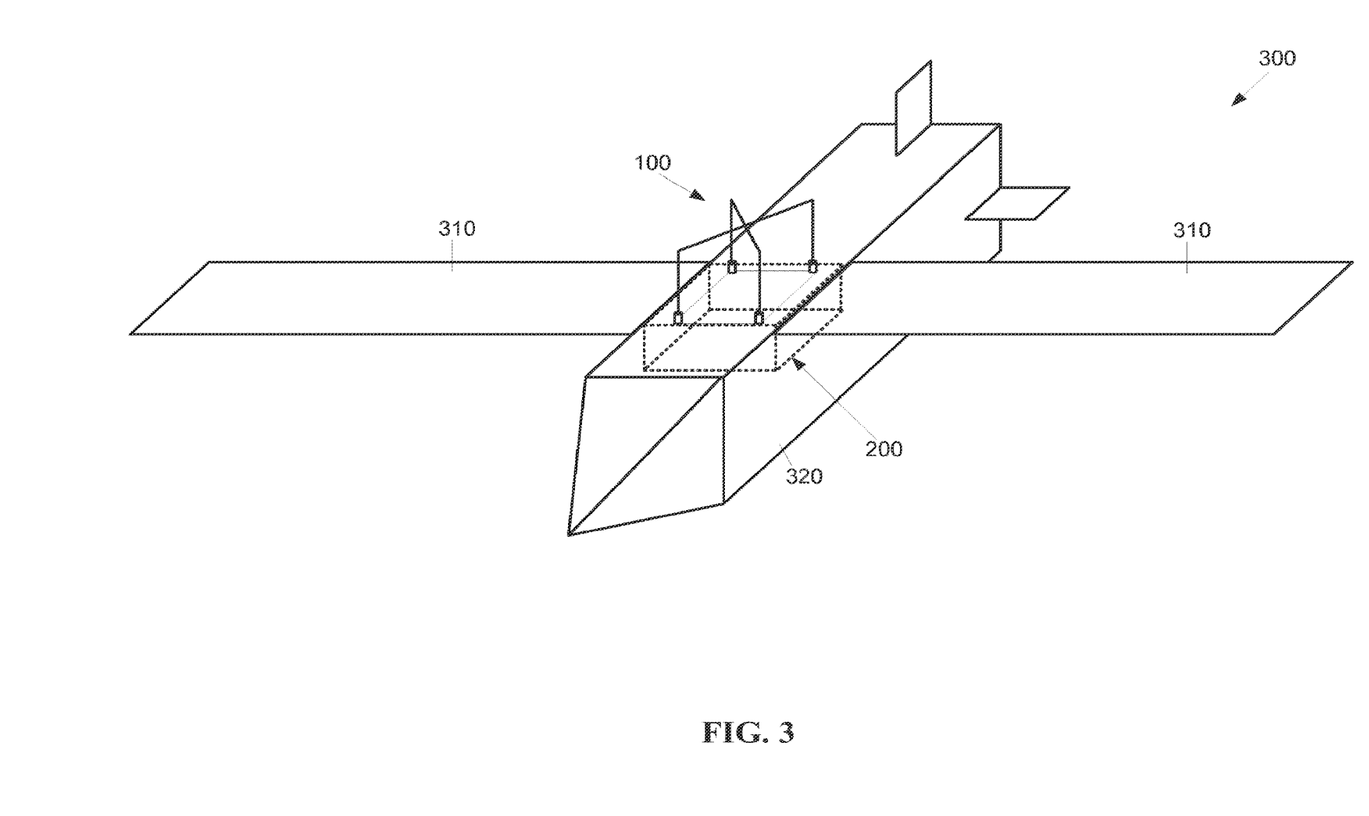
FIG. 3 is a schematic diagram of an exemplary embodiment of the system of FIG. 2 as deployed in an aircraft.

FIG. 3 shows an exemplary embodiment of the system 200 and the antenna 100 as deployed in an aircraft 300, for example, a UAV. The antenna 100 may be deployed on the wing 310, as shown, for example, embedded in the center of the wing 310, and the system 200 may be deployed within the fuselage 320, for example, in a transit bay. In alternative embodiments, the antenna 100 may be deployed on the fuselage 320, or components of the antenna 100 may be distributed across the wings 310 and fuselage 320. For example one or more of the loop antennas 115, 125, 135 may be located on the wing 310, while the remaining loop antennas are located in or on the fuselage 320. Similarly, one or more of the dipole antennas 110, 120, 130 may be located on the wing 310, while the remaining dipole antennas are located in or on the fuselage 320.

As shown in FIG. 3, the components of the system 200 are co-located in the fuselage 320. However, in alternative embodiments, the components of the system 200 may be distributed within the fuselage 320 and/or the wing 310, for example, to better distribute the weight for aerodynamic purposes. The weight of the system 200 may be, for example, in the range of 1-4 pounds.

As deployed in a UAV, such a system having an L-band 3 W radar using the D-D azimuth scan antenna configuration described above may detect small manned aircraft (0 dBsm) out to approximately 2 nmi exo-clutter and out to the radar height above the ground endo-clutter.

CSAs facilitate scanning beams from a single phase center but with fixed modest gain, for example, on the order of 5 dBi. Lower frequency designs may take advantage of the fixed gain to yield relatively large effective receive apertures, assuming that antenna efficiency is adequate. Appropriate applications which may take advantage of such an antenna include, but are not limited to: Short-range air-to-air radar for UASs for sense and avoid, local compact radar designs ("radar on a flagpole"), and steerable compact communications antennas.

The antenna 100 and system may be implemented as a low-cost, compact, lightweight radar that fits on a UAS and facilitates the safe co-use of airspace for manned and unmanned aircraft. An estimate of the performance of such a pulse-Doppler radar based on the CSA follows for a range of potential radar frequencies. Lower frequencies have better ideal radar detection performance due to the fixed gain, but may suffer inefficiencies as the antenna becomes electrically smaller. It is unclear what frequencies limit the effects of near-field scattering off of the UAS airframe.

The UAS SAA radar assumptions follow, with detection range estimates shown in Table 1.

TABLE 1

| Frequency | 0 dbsm | 10 dbsm |
|---|---|---|
| UHF | 5.7 km | 10.2 km |
| L-band | 3.7 km | 6.7 km |
| S-band | 2.2 km | 3.9 km |

A several-kilometer detection range over 360° appears feasible.
UAS SAA assumptions:
UHF, L or S-band
300 W peak power
1% duty factor
30 kHz PRF
1 second scan in the horizontal plane with 8 beam positions (0.12 sec dwell time)
13 dB Signal to noise ratio (SNR)
10 dB noise figure plus losses
5 dBi gain assumed (inefficiencies likely at lower frequencies)
0 to 10 dBsm manned aircraft radar cross section The vector sensor on receive provides very good estimates of both azimuth and elevation angles. The expected angle errors are approximately 8° 1−σ at the maximum detection range, falling as $1/\sqrt{SNR}$ down to a calibration-limited noise floor on the order of a few degrees.

The utility of this radar hinges on the available reaction time to targets approaching the radar-equipped UAS from various approach angles and speeds. Clutter effects may potentially limit detection ranges in certain geometries as well. An assessment of clutter limited performance follows.

Figure 4A:
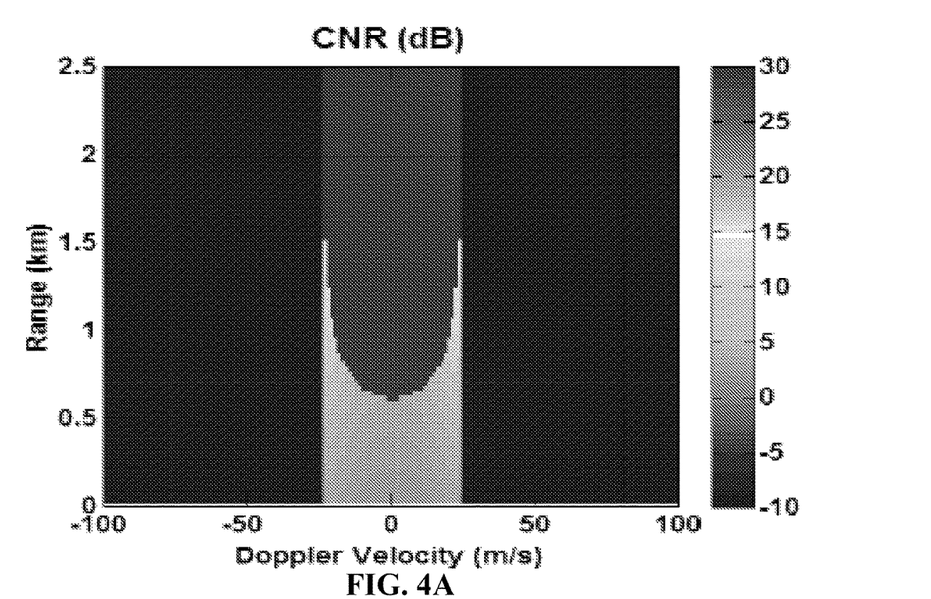
FIG. 4A is a plot of an exemplary CNR for ground clutter.

Due to the single phase center nature of the CSA antenna, ground clutter returns from a moving aircraft cannot be cancelled and the resulting detection space will be reduced. However, clutter will be limited in Doppler velocity between +/−VUAV, the UAV velocity, and high-speed incoming or outgoing targets may be detected in the clutter-free regions and the Table I free space results may hold. Additionally, there may be a low clutter return region at ranges less than the UAV altitude. This low clutter return arises from second time around clutter from ambiguous ranges. A plot of the predicted clutter-to-noise ratio (CNR) for an L-band UAS SAA radar is shown in FIG. 4A. A −12 dB constant gamma clutter model is assumed with 10 m range gates. The radar is assumed to be flying at 500 m altitude at 25 m/s.

Due to the high SNR of targets at short range, this low level clutter at short range and +/−25 m/s does not prevent target detection. All Dopplers are shown, but for the purposes of a sense-and-avoid radar, the system is only concerned with targets that are closing in range and, hence, have positive Doppler shifts.

Figure 4B:
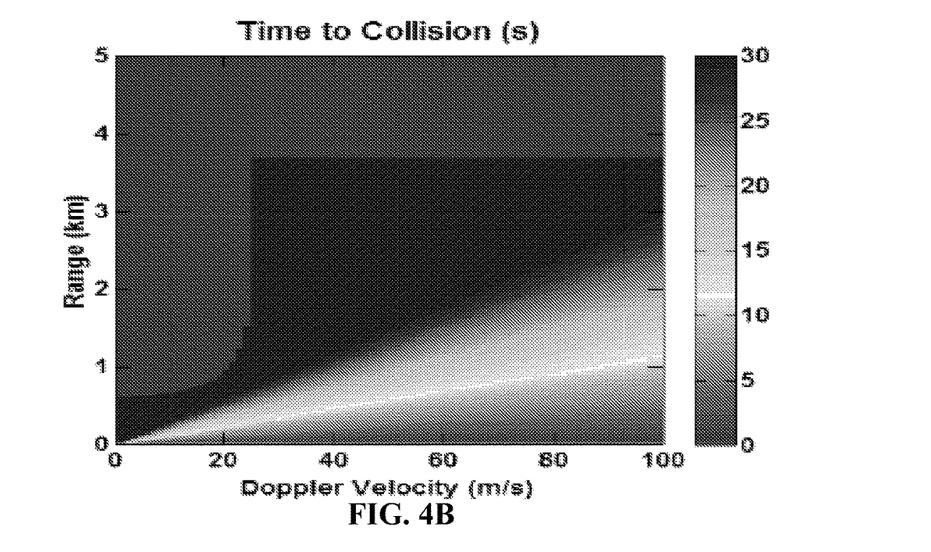
FIG. 4B is a plot of collision time for co-altitude targets on a collision course.
Figure 5:
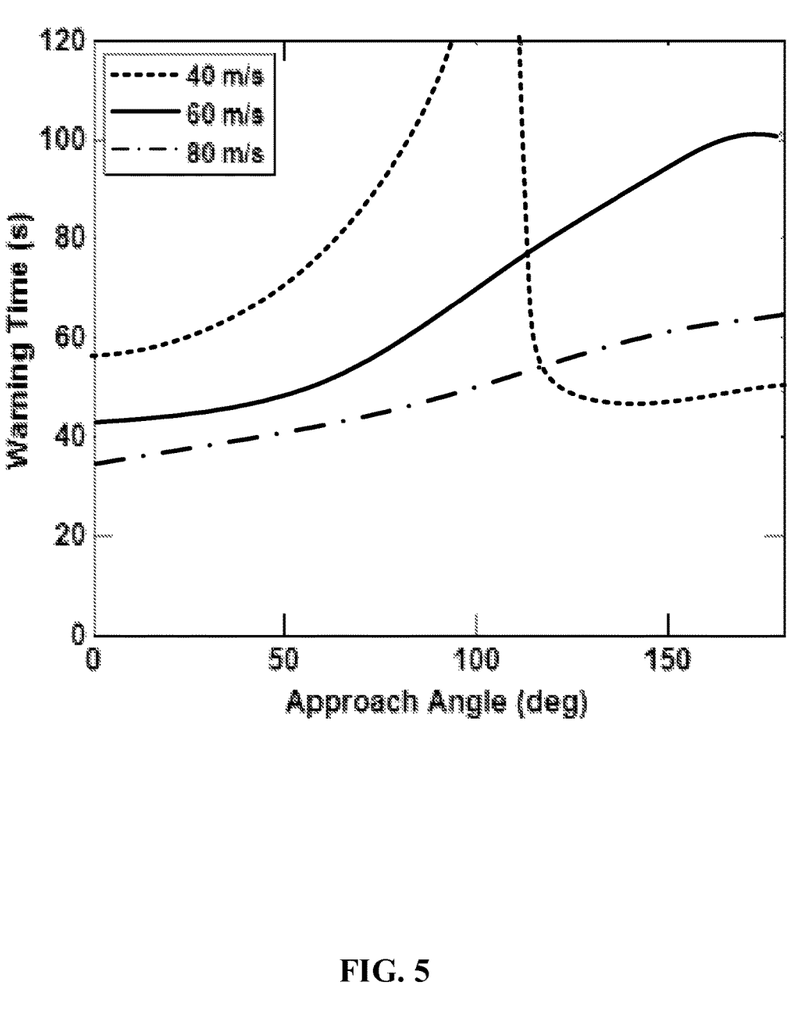
FIG. 5 is a plot of warning time vs. approach angle for general aviation class speeds.

An estimate of the worst-case (shortest) time to collision can be made by assuming co-altitude constant velocity targets on a collision course with the UAV. FIG. 4B plots the time to collision for 0 dBsm targets. The warning time that could be provided to the UAV of potential collisions exceeds 30 seconds at modest closing speeds. An estimate of the warning time afforded to the UAV for a range of manned aircraft speeds is shown in FIG. 5. For smaller general aviation aircraft, 40 m/s is representative of aircraft landing speeds, 60 m/s is a typical cruise speed and 80 m/s is a typical maximum speed. Higher speed aircraft are always detected in the exo-clutter region at the noise-limited free-space ranges calculated earlier. The warning times for this case are lowest in the head-on collision situation with steadily increasing warning times as the geometry transitions to an overtake geometry. At the slowest speed considered, head-on collisions are also in the exo-clutter region, but at increased approach angles, target detection becomes clutter limited resulting in a dramatically reduced warning time at larger approach angles. However, in all cases warning times in excess of 30 seconds are provided. These simple analyses indicate that a CSA-based UAS SAA radar is practicable.

Figure 6:
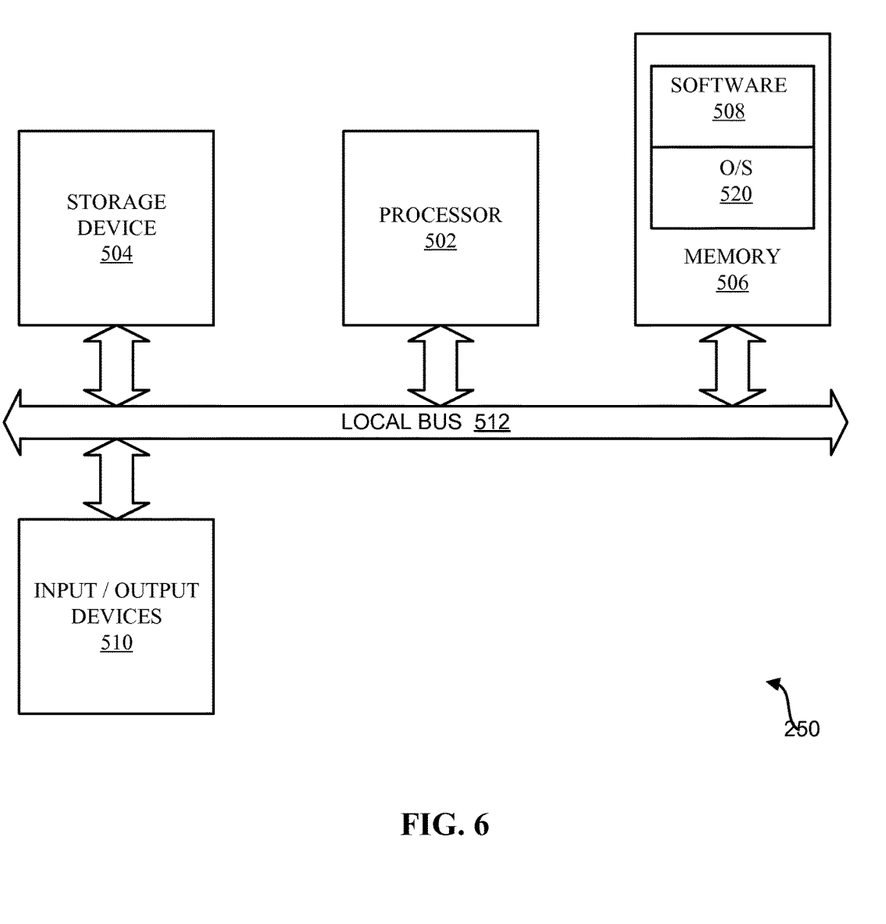
FIG. 6 is a schematic diagram illustrating an example of a digital processing board for executing functionality of the present invention.

As previously mentioned, the present system for executing the functionality described in detail above may be a digital processing board, an example of which is shown in the schematic diagram of FIG. 6. The system 250 contains a processor 502, a storage device 504, a memory 506 having software 508 stored therein that defines the abovementioned functionality, input and output (I/O) devices 510 (or peripherals), and a local bus, or local interface 512 allowing for communication within the system 250. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 250, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 250, in accordance with the present invention. The software 508 in the memory 506 may include one or more separate programs, each of which contains an ordered listing of executable instructions for implementing logical functions of the system 250, as described below. The memory 506 may contain an operating system (O/S) 520. The operating system essentially controls the execution of programs within the system 250 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 250 is in operation, the processor 502 is configured to execute the software 508 stored within the memory 506, to communicate data to and from the memory 506, and to generally control operations of the system 250 pursuant to the software 508, as explained above.

When the functionality of the system 250 is in operation, the processor 502 is configured to execute the software 508 stored within the memory 506, to communicate data to and from the memory 506, and to generally control operations of the system 250 pursuant to the software 508. The operating system 520 is read by the processor 502, perhaps buffered within the processor 502, and then executed.

When the system 250 is implemented in software 508, it should be noted that instructions for implementing the system 250 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 250 is implemented in hardware, the system 250 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In summary, a compact steerable antenna (CSA) design utilizing electric and magnetic dipoles arranged in a vector-sensor type geometry is described which can transmit in any azimuth and elevation direction with negligible scan loss. A UAS SAA radar design based on a CSA provides a several-kilometer detection ranges vs manned aircraft allowing 30+ second warning times with few-degree angle estimation errors. The CSA facilitates a low-weight and low-power radar design that could be flown on smaller UAS allowing them to share airspace with manned aircraft.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transmit antenna system configured to steer an electromagnetic beam, comprising:
   an antenna comprising:
   a first electric antenna element oriented parallel to a first plane;
   a second electric antenna element oriented orthogonally to the first electric antenna element and parallel to the first plane; and
   a first magnetic antenna element oriented orthogonally to the first electric antenna element and the second electric antenna element; and
   an electronic steering module in electrical communication with each of the first electric antenna element, the second electric antenna element, and the first magnetic antenna element, comprising at least one amplifier configured to control the amplitude of a current to each of the first electric antenna element, the second electric antenna element, and the first magnetic antenna element;
   further comprising a third electric antenna element oriented orthogonally to the first electric antenna element and the second electric antenna element, wherein the electronic steering module in electrical communication with the third electric antenna element.

2. A transmit antenna system configured to steer an electromagnetic beam, comprising:
   an antenna comprising:
   a first electric antenna element oriented parallel to a first plane;
   a second electric antenna element oriented orthogonally to the first electric antenna element and parallel to the first plane; and
   a first magnetic antenna element oriented orthogonally to the first electric antenna element and the second electric antenna element; and
   an electronic steering module in electrical communication with each of the first electric antenna element, the second electric antenna element, and the first magnetic antenna element, comprising at least one amplifier configured to control the amplitude of a current to each of the first electric antenna element, the second electric antenna element, and the first magnetic antenna element;
   further comprising a second magnetic antenna element oriented orthogonally to the first magnetic antenna element, wherein the electronic steering module in electrical communication with the second magnetic antenna element;
   further comprising a third magnetic antenna element oriented orthogonally to the first magnetic antenna element and the second magnetic element, wherein the electronic steering module in electrical communication with the third magnetic antenna element.

3. A steerable transmit antenna, comprising:
   a first magnetic loop antenna oriented parallel to an x-y plane;
   a second magnetic loop antenna oriented parallel to an x-z plane;
   a third magnetic loop antenna oriented parallel to a y-z plane;
   a first electric dipole antenna oriented parallel an x-axis intersecting the x-y and x-z plane;
   a second electric dipole antenna oriented parallel a y-axis intersecting the x-y and y-z plane; and
   a third electric dipole antenna oriented parallel a z-axis intersecting the x-z and y-z plane,
   wherein the x-y plane, the x-z plane, and y-z plane are mutually orthogonal and intersect at an origin
   an electronic steering module in electrical communication with each of the magnetic loop antennas and each of the electric dipole antennas comprising at least one amplifier configured to controlling the amplitude of a current to each of the magnetic loop antennas and each of the electric dipole antennas.

4. The antenna of claim 3, wherein at least two of the first magnetic loop antenna, the second magnetic loop antenna, and the third magnetic loop antenna have a center point at the origin.

5. The antenna of claim 3, wherein at least two of the first electric dipole antenna, the second electric dipole antenna, and the third electric dipole antenna have a center point at the origin.

6. The antenna of claim 3, further comprising a plurality of leads configured to electrically connect each dipole and loop to a receiver.

7. A system comprising
   a steerable antenna, comprising:
   a first magnetic loop antenna oriented parallel to an x-y plane;
   a second magnetic loop antenna oriented parallel to an x-z plane;
   a third magnetic loop antenna oriented parallel to a y-z plane;
   a first electric dipole antenna oriented parallel an x-axis intersecting the x-y and x-z plane;
   a second electric dipole antenna oriented parallel a y-axis intersecting the x-y and y-z plane; and
   a third electric dipole antenna oriented parallel a z-axis intersecting the x-z and y-z plane,
   wherein the x-y plane, the x-z plane, and y-z plane are mutually orthogonal and intersect at an origin;
   a transmitter in communication with each of the dipole and loop antennas and configured to transmit a signal from the dipole and loop antennas of the steerable antenna; and
   a digital board in communication with the transmitter, configured to steer an output from the transmit and determine a propagation vector of a beam transmitted by the steerable antenna.

8. The system of claim 7, further comprising a clock synthesizer configured to provide a clock signal to the digital processor board and/or the receiver.

9. The system of claim 7, further comprising a power supply configured to provide power to the digital processor board and the receiver.

10. The system of claim 7, wherein the power provided by the power supply is less than 8 watts.

* * * * *